United States Patent [19]

Githens et al.

[11] Patent Number: 5,301,751

[45] Date of Patent: Apr. 12, 1994

[54] METHOD FOR USING SOAP AS A SOLUABLE FLUID LOSS ADDITIVE IN THE HYDRAULIC FRACTURING TREATMENT OF OIL AND GAS WELLS

[76] Inventors: Charles J. Githens, 3148 Cache Rd., Lawton, Okla. 73505; William G. Harrison, P.O. Box 2450, Wichita Falls, Tex. 76307

[21] Appl. No.: 964,012

[22] Filed: Oct. 21, 1992

[51] Int. Cl.$^5$ ............................................. E21B 43/26
[52] U.S. Cl. ..................................... 166/283; 166/291; 166/302; 166/303; 166/308; 252/8.551
[58] Field of Search ................ 166/282, 283, 291, 294, 166/302, 303, 308; 252/8.551

[56] References Cited

U.S. PATENT DOCUMENTS

| | | | |
|---|---|---|---|
| 2,734,861 | 2/1956 | Scott, Jr. et al. | 166/283 X |
| 2,997,441 | 8/1961 | Freeland | 252/8.551 |
| 3,046,222 | 7/1962 | Phansalkar et al. | 166/283 |
| 3,065,171 | 11/1962 | Morrow et al. | 166/283 |
| 3,291,211 | 12/1966 | Savins et al. | 166/291 X |
| 3,369,603 | 2/1966 | Trantham . | |
| 3,865,189 | 2/1975 | Friedman | 166/294 |
| 3,989,632 | 11/1976 | Fischer et al. | 166/283 X |
| 4,476,931 | 10/1984 | Boles et al. | 166/294 |

*Primary Examiner*—George A. Suchfield
*Attorney, Agent, or Firm*—Sixbey, Friedman, Leedom & Ferguson

[57] ABSTRACT

The method of using soap as a fluid loss additive in the hydraulic fracturing treatment of oil and gas wells includes choosing a soap having a titre value which will insure that the soap will dissolve and liquify at the formation temperature in the area where fluid loss is to be reduced. The formation temperature in this area is reduced to an extent where the soap will not liquify, while the soap is introduced into the area under pressure, and this lower temperature is maintained while a fracturing or cementing process is carried out. Subsequently, the temperature in the area where fluid loss is to be reduced is permitted to rise and liquify the soap which is then removed from the well.

22 Claims, No Drawings

METHOD FOR USING SOAP AS A SOLUABLE FLUID LOSS ADDITIVE IN THE HYDRAULIC FRACTURING TREATMENT OF OIL AND GAS WELLS

TECHNICAL FIELD

The present invention relates generally to the hydraulic fracturing stimulation treatment of oil and gas wells, and more particularly to an improved method of fracturing which employs soap as a fluid loss additive.

BACKGROUND OF THE INVENTION

Hydraulic fracturing was developed approximately fifty years ago as a means of stimulating the production of oil or gas wells. A hydraulic fracturing stimulation treatment is achieved by pumping a selected fractionating fluid ("frac fluid") into the formation zone of interest at a pressure that exceeds the tensil strength of the rock formation plus its closure or stress pressure. The formation will thus be caused to rupture and the fracture will extend in a plane that is perpendicular to the direction of the least stress at that point.

Over the years, the magnitude of hydraulic fracturing stimulation treatments has increased to a point where thousands of gallons of fluid carring many tons of proppant, such as sand, are used for some treatments. Fracture length is very important to the success of the treatment, and as the size of the treatments increased in an attempt to extend a newly created fracture farther and farther from the well bore and deeper into the matrix of the formation, a fluid loss problem became prevalent. Fracture extension can only be achieved with fluid which is retained in the fracture, but since pressure is greater in the fracture than it is in the surrounding formation, the frac fluid tends to leak off into the matrix of the formation. This leakage not only reduced significantly the fracture length or extension which could be attained with a given amount of frac fluid, but the fluid lost into the formation can, in some instances, damage the permeability of the rock. Also, the loss of fluid from the fracture may increase the proppant to fluid ratio to the extent that a "screen out" occurs. A screen out is a condition where the proppant concentration becomes too high for the fluid to carry which in turn causes the pumping pressure to become excessive. When this happens, the treatment must be terminated and the clean-up required is both time consuming and expensive.

To combat frac fluid leakage, various fluid loss additives have been incorporated into the fluid used in the fracturing treatment. Often, these fluid loss additives consist of a finely ground or powdered material, and very few insoluble granular materials have escaped having been employed as a fluid loss aid at one time or another. The theory behind the use of such materials is that the individual particles will plug the pore spaces in the fracture wall, thereby restricting the flow of frac fluid from the fracture into the formation matrix.

The problem experienced with insoluble fluid loss additives is that once the pressure within the fracture is released, and as the well begins to produce, these additives are seldom flushed out of the formation. To be effective, the fluid loss material must wash off the fracture face, thereby clearing the pore spaces in the formation to permit the flow of hydrocarbon materials from the formation in to the fracture and from there to the surface. However, many insoluble fluid loss additives continue to plug the matrix to reduce hydrocarbon flow, and that which is washed off the fracture face during clean-up often falls into the proppant bed and remains in the well. Fluid loss additives trapped in the proppant bed reduce the permeability of the bed and in turn the production of the well is reduced.

A further disadvantage of insoluble granular materials when used as a fluid loss additive is their lack of malleability. The pores in a rock formation matrix are of irregular shape and are often difficult to plug with non-malleable particles. More malleable materials, such as starches, waxes and gels have been used as fluid loss additives in place of insoluble granular materials, but again these materials have properties which, for some applications, prove to be disadvantageous. Starches require the addition of a breaker material before they can be removed from the fracture wall, while waxes leave a residue which restricts hydrocarbon flow. Also, wax particles tend to stick under the valve seats of pumps for the frac fluid causing pump malfunction. Finally, gels, such as guar gel, form a filter cake or thick coating of dehydrated gel on the fracture face which is harmful to hydrocarbon production and very difficult to remove.

Attempts have been made to use water soluble, oil insoluble soap to plug the porous water-rich strata of a subterranean formation so that water from these strata will not be selectively produced by driving fluid to adversely affect oil-to-water ratios. However, as indicated by U.S. Pat. No. 3,865,189 to Friedman, a soap is used for this purpose which chemically reacts in the subterranean formation with reactants either already present in the formation or with reactants injected with the soap to produce a water insoluble, oil soluble soap. The use of a soap which becomes water insoluble is not suitable for use as a fluid loss additive in a hydraulic fracturing stimulation treatment, for such soap becomes an insoluble fluid loss additive which cannot be removed by water at the end of the fractionating process. Instead it would remain to block oil flow until ultimately it would dissolve to foul the oil with soap.

Practically all known fluid loss additives presently in use tend to damage the "regain" or production of a well to some degree. However, the fracture or fracture extension created by a hydraulic fracturing treatment greatly increases the relative hydrocarbon drainage area, and thus total production from the enlarged drainage area is usually much greater than it was prior to treatment. The amount of damage which may result is always a matter of great concern during the selection of a fluid loss additive material for a particular application, and there is an on-going quest to find economical, less damaging, biodegradable and non-residue forming materials which may be effectively used for this purpose.

SUMMARY OF THE INVENTION

It is a primary object of the present invention to provide a novel and improved method of hydraulic fracturing stimulation which includes the use of a fluid loss additive which is economical, effective to prevent leaking of fluid from the fracture and is less damaging to the regain. The fluid loss additive is safe, easy to handle and biodegradable, and is easily dispersable in the frac fluid.

Another object of the present invention is to provide a novel and improved method of hydraulic fracturing stimulation which includes the use of a fluid loss additive to promote foaming to lower the density and hydrostatic weight of the water or other frac fluid during clean-up. The fluid loss additive further lowers the surface tension of the fluid which in turn tends to lower pumping pressure.

A further object of the present invention is to provide a novel and improved method of hydraulic fracturing stimulation which includes adding soap as a fluid loss additive to the frac fluid and maintaining the temperature of the frac fluid below the titre of the soap as it is being pumped into a well.

Yet another object of the present invention is to provide a novel and improved method of hydraulic fracturing stimulation which includes adding soap as a fluid loss additive to the frac fluid, maintaining the temperature of the frac fluid below the titre of the soap as it is being pumped into the well and fracturing is accomplished and subsequently letting the temperature of the fluid and the fracture rise above the titre of the soap to dissolve and liquify the soap.

A still further object of the present invention is to provide a novel and improved method of hydraulic fracturing stimulation which includes adding a soap and a gel to a frac fluid to cause the soap to form a film on the fracture wall beneath the gel to facilitate the prevention or removal of filter cakes or layers of dehydrated gel from the fracture wall during clean-up. Thus gels, such as guar gel, may be effectively used to increase the viscosity of the frac fluid so that it provides better support for the proppant.

DESCRIPTION OF THE PREFERRED EMBODIMENTS

Oil and gas wells vary greatly in respect to their depths, temperatures, pressure, types of formations and their residual fluids, thereby making it difficult to find one particular product that will be the best fluid loss additive for all situations. However, for many of such situations, soap, when used under controlled conditions in accordance with this invention, provides a highly effective fluid loss additive.

The soaps employed in accordance with this invention must have a designated titre which is the centegrade temperature at which the fatty acid in the soap changes from a solid to a liquid, and this is the temperature where the soap will melt and dissolve rapidly in water. This temperature, which for purposes of description will be identified as the "soap melting temperature", is the limit at which such soaps in water change rapidly from a solid to a liquid state. It has been found that when these soaps are maintained below their respective melting temperatures, they dissolve very slowly, if at all, in water and similar liquids, and consequently remain in a solid but malleable state.

As a fluid loss additive, soaps used in accordance with this invention provide exceptional qualities not furnished by other more conventional fluid loss additives. They reduce both friction and the surface tension of the frac fluid to thereby reduce the pumping pressures required to accomplish a hydraulic fracturing operation, and once dissolved in the frac fluid, they tend to foam and reduce the overburden. Soaps are biodegradable, and provide a detergent action which facilitates well clean-up with water at the end of a fracturing process. They promote rapid clean-up and are effectively carried away with the water leaving substantially no residual material to reduce oil or gas production.

Perhaps one of the most advantageous characteristics of selected soaps as a fluid loss additive, when used in the manner defined by this invention, is the inherent ability of soap particles to soften in liquid heated to a temperature below the titre of the soap and become malleable without dissolving, as these malleable soap particles are pumped into a subterranean formation, they conform to the shape of irregularly shaped pores in the formation to effectively seal these pores. As the soap particles are pressed by the pressurized frac fluid against a fracture wall, they tend to flatten out, forming a wax-like coating which covers the fracture faces.

With the nonmalleable fluid loss additives which are commonly used at the present time, such as silica flour, talc and clay, the particle size of the additive is critical. Fluid loss control is greatly affected by formation properties such as permeability, porosity and pore size distribution. Each of these properties may vary from one formation to another, and the fluid loss additive or blend of additives used must be matched to the formation. For a formation having irregularly shaped or larger pores, nonmalleable fluid loss additives having a large particle size must be used. However, when soap is selected and used in accordance with this invention, the particle size of the soap becomes less critical, as the soap particles will flatten and spread, and thus soap having a given particle size may be universally used effectively for a number of formations having differing formation properties.

Pursuant to the present invention, the formation temperature of a well is determined and then a soap having a titre to match this formation temperature is selected. The titre of the soap selected should be such that the soap will dissolve in frac fluid at the formation temperature or at a temperature below but close to that of the formation temperature. As will be seen, if the titre of the soap is such that it dissolves at a temperature too far below that of the formation temperature, it becomes more difficult to cool the down hole temperature sufficiently to maintain the soap at the fracture face in a malleable but solid form. Also, although the titre of the soap can be selected so that is dissolves at the formation temperature, it is generally preferable to have the soap dissolve at a few degrees F. below the formation temperature to insure that the soap will completely pass into solution with little or no residue as the formation temperature is reestablished at the end of a fracturing operation.

The method of the present invention involves controlling the down-hole temperature in a well during a hydraulic fracturing treatment so that soap having a selected known titre is maintained in solid but malleable form when subjected to the frac fluid at the fracture face. Then, once the fracturing process is complete, the newly created fracture is permitted to return toward the original formation temperature so that the soap dissolves in the frac fluid and flows or is pumped from the well during cleanup. Normally, as indicated in the following example, the down-hole temperature of the well and the state of the selected soap as either a solid or a liquid can be controlled by controlling the temperature of the frac fluid. Initially, frac fluid with soap can be pumped into the well to lower the formation temperature, and once the temperature is decreased below the titre of the soap, the newly added soap will remain substantially solid during the fracturing process.

EXAMPLE 1

A hydraulic fracturing stimulation treatment for a well having a 100° F. formation temperature may be carried out with a frac fluid having a fluid temperature of 70° F. Thirty pounds of soap particles, either granular or in flake form, having a titre of 35 are added per 1000 gallons of frac fluid, and this mixture is pumped under pressure into the fracture. Soap with a titre of 35 will dissolve at a temperature of 95° F., but the frac fluid at an initial temperature of 70° F. will absorb heat and lower the fracture temperature below 95° F., causing the soap to become malleable but to remain in solid form. This soap, under pressure from the frac fluid, flattens against the fracture face to perform a fluid loss function. When the fracturing process is complete, the well is shut in and the temperature in the newly created fracture rises back toward the original formation temperature. As the fluid in the fracture reaches 95° F., the soap on the fracture face dissolves and becomes liquid, and is then removed from the well during clean-up. Once the soap becomes liquid, it will remain in this form regardless of temperature. To speed the removal of the soap once the fracturing process is complete, a hot water flush can be introduced into the well to raise the temperature of the fluid in the fracture. For this purpose, the temperature of the water used for the flush is well above the titre of the soap.

In accordance with the present invention, soaps having a titre value within a range of from 20–60 are used, and 10 to 50 pounds of soap per 1000 gallons of water or similar frac fluid may be used. The preferred range used, however, is 20–40 pounds of soap having a titre value within the range of from 25 to 45 per 1000 gallons of water or frac fluid. A soap titre range of from 20 to 60 tends to limit the method of the present invention to applications involving lower temperature wells, particularly when only frac fluid of a reduced temperature is used to lower the down-hole formation temperature. However, additional cooling agents, such as nitrogen can be used to expand the temperature limitations imposed by the soap. The use of a cooling agent in combination with frac fluid having a temperature which is lower than the formation temperature in the well can produce an enhanced down-hole cooling effect which will permit the use of soap as a fluid loss additive in higher temperature wells where the combination of frac fluid and soap alone would not sufficiently lower the formation temperature at the fracture face.

For applications where the properties of other fluid loss additives render them preferable, soap can still often perform a valuable function when used in combination with another fluid loss additive. As indicated in the following example, soap can be used in combination with gels, such as guar gel, to prevent or facilitate the removal of the cake of dehydrated gel from the fracture face during cleanup.

EXAMPLE 2

With the well of Example 1, having a 100° F. formation temperature, frac fluid at a temperature of 70° F. was again introduced under pressure into the well. Initially soap having a titre of 35 was added as before to the frac fluid to cause the soap to form a base layer on the fracture face. Subsequently, a guar gel was added in known manner to the frac fluid to increase the viscosity of the fluid to change the fracture geometry. Then proppant is added to the viscous fluid to complete the fracturing process. Normally, this guar gel would form a dehydrated gel cake or coating which would be difficult to remove from the fracture face, but the soap substantially prevents the cake from forming. When the well is shut in after the fracture process is complete and the down-hole temperature rises, the base layer of soap dissolves causing any dehydrated gel which may have formed to drop off the fracture face. Although the soap was added to the frac fluid prior to the gel to form the base layer before addition of the gel, the two can be added simultaneously, for the soap, for some applications, will form a sufficient base layer before the gel cakes on the fracture face.

Soap, when chosen and used as a fluid loss additive in the manner taught by this invention is effective, does not inhibit the flow of hydrocarbon into the fracture after the completion of the fractionation process, and does not impede the functions of other chemicals or adversely affect down-hole conditions. Soap is inexpensive, safe, easy to handle, disposable, and biodegradable, and therefore has characteristics which make it a desirable fluid loss additive. The soap may even be used as a fluid loss additive for operations in a well other than hydraulic fracturing. For example, for cementing in the well where cement is pumped into the well and along the well face, soap may first be introduced to prevent fluid loss during the cementing operation.

We claim:

1. A method for using soap as a fluid loss additive in a well having a normal down-hole formation temperature in an area where fluid loss is to be reduced which includes;

reducing the down-hole formation temperature in the area where fluid loss is to be reduced to a reduced temperature below the normal down-hole formation temperature, introducing soap as a fluid loss additive into the area where fluid loss is to be reduced, said soap having a titre which will cause the soap to remain substantially solid until it is subjected to a soap melting temperature above said reduced temperature but at or below said normal formation temperature, and maintaining the temperature in the area where fluid loss is to be reduced below said soap melting temperature for a period during which said soap is to function as a fluid loss additive.

2. The method of claim 1 wherein the titre of said soap is such that the soap melting temperature is less then the normal formation temperature.

3. The method of claim 1 wherein the titre value of said soap is within the range of from 20 to 60.

4. The method of claim 1 wherein the titre value of said soap is within the range of from 25 to 45.

5. The method of claim 1 wherein said soap is introduced in combination with a fracturing fluid under pressure.

6. The method of claim 5 wherein said fracturing fluid is introduced at a temperature below said normal down-hole formation temperature to create and maintain said reduced temperature in the area where fluid loss is to be reduced.

7. The method of claim 6 wherein said soap is mixed in particle form in said fracturing fluid.

8. The method of claim 7 wherein said fracturing fluid is water and soap in an amount within the range of from 10 to 50 pounds is mixed with 1000 gallons of water.

9. The method of claim 8 wherein the titre value of said soap is within the range of from 20 to 60.

10. The method of claim 7 wherein said fracturing fluid is water and soap in an amount within the range of from 20 to 40 pounds is mixed with each 1000 gallons of water.

11. The method of claim 10 wherein the titre value of said soap is within the range of from 25 to 45.

12. The method of claim 5 wherein the tire of said soap is such that the soap melting temperature is less then the normal formation temperature.

13. The method of claim 5 wherein a gel in addition to soap is introduced into the area where fluid loss is to be reduced, said gel being a material which will increase the viscosity of the fracturing fluid.

14. The method of claim 13 wherein said soap is introduced before the introduction of said gel.

15. The method of claim 1 which includes pumping cement in liquid form into the well subsequent to the introduction of said soap while said soap is functioning as a fluid loss additive.

16. A hydraulic fracturing stimulation method for a subterranean well having a down-hole formation temperature in the area of a fracture which includes;

adding soap to a fracturing fluid, said soap having a titre which will cause the soap to remain substantially solid in the fractionating fluid until it is subjected to a melting temperature at or below the formation temperature which will cause the soap to liquify, introducing the soap-fractionating fluid mixture into the well and the area of the fracture under pressure at a temperature below the melting temperature for the soap to reduce fluid loss, and subsequently permitting the temperature in the area of the fracture to rise above the melting temperature for the soap to liquify the soap.

17. The hydraulic fracturing stimulation method of claim 16 which includes adding soap to the fracturing fluid which has a titre which will cause the soap to liquify at a temperature which is lower than the formation temperature in the area of said fracture.

18. The hydraulic fracturing stimulation method of claim 16 which includes removing the liquified soap from the well after it liquifies.

19. The hydraulic fracturing stimulation method of claim 18 which includes maintaining the area of said fracture at a temperature which is less than the melting temperature of said soap while introducing fracturing fluid to said area to extend the fracture area.

20. The hydraulic fracturing stimulation method of claim 19 which includes controlling the temperature of said fracturing fluid to maintain the temperature in the area of said fracture below the melting temperature of said soap.

21. The hydraulic fracturing stimulation method of claim 20 wherein the temperature in the area of the fracture is permitted to rise above the melting temperature for the soap after the fracture area has been extended.

22. The hydraulic fracturing stimulation method of claim 20 which includes flushing the area of the fracture after the fracture area has been extended with water having a temperature higher than the melting temperature of the soap to expedite liquifying of the soap.

* * * * *